United States Patent Office 3,314,772
Patented Apr. 18, 1967

3,314,772
CORROSION RETARDING FLUORINE TREATMENT OF GLASS SURFACES
James P. Poole, Brockport, and Herbert C. Snyder and Robert J. Ryder, Brockway, Pa., assignors to Brockway Glass Company, Inc., Brockway, Pa.
No Drawing. Filed Apr. 26, 1966, Ser. No. 545,250
3 Claims. (Cl. 65—30)

This application is a continuation-in-part of application Ser. No. 318,069 filed Oct. 22, 1963, and now abandoned.

This invention relates to the treatment of newly formed glass surfaces to increase the chemical durability of such surfaces and render them more resistant to corrosion.

Commercial soda-lime silica glasses such as are commonly used in the manufacture of containers and other glassware, including window glass, are corroded to some degree by contact with water or other liquids. It is known in the art that water attacks soda-lime glass by extracting soda from the glass. In recognition of this defect various expedients have been practiced.

The durability of the glass can be improved by variations in chemical compositon, such as by the addition of alumina, borate and/or by a reduction in the alkali content of the glass. However, these modifications in chemical composition increase the difficulty of melting and forming the glass and therefore the degree to which the chemical composition may be thus modified is greatly limited.

The relative inertness of soda lime silica glasses to attack by water and acid solutions has resulted in the use of soda-lime silica glasses as containers for many products. When extreme inertness is desired special glasses of very high silica content and very low alkali may be employed, such as Corning Glass Company's Vycor or Pyrex. However, these glasses are extremely difficult to melt and fabricate and are therefore not practical or economical for most commercial glass container applications. It is to be understood that the term soda-lime glass as used herein does not include these special high silica glasses, since such glasses do not contain extractable alkali and accordingly do not present the present corrosion problem.

Since the attack by water on soda-lime glass manifests itself by extraction of soda from the glass, one method of increasing the durability of glass in this respect is to dealkalize the glass surface during annealing by sulfur treatment.[1] In this process sulfur dioxide gas is passed over the hot glass surface and reacts with the available alkali to form sodium sulfate which appears on the glass surface as a "bloom" or film which can be removed by a water rinse. The resulting surface is lower in alkali than the main body of glass and than the original surface. The surface therefore has improved resistance to corrosion by water and acids, at least insofar as migration of alkali from the glass is concerned. However, this treatment is subject to other objections and, particularly, its resistance to alkaline solutions is not improved and probably actually decreases.

A further alternative which likewise extracts alkali from the glass surface comprises a base exchange process by means of hydrogen clay, or even by electrolysis.[2]

In these various dealkalization processes it is believed that the sodium ion (Na+) is exchanged for a hydrogen ion or proton (H+), as follows:

[1] See notes at end of specification.
[2] See notes at end of specification.

so that electroneutrality is preserved. In the case of the sulfur dioxide treatment, the hydrogen ion is obtained from the water in the air or combustion gases which combines with the sulfur dioxide so that the reactive gas is actually sulfuric acid vapor, as follows:

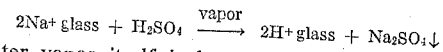

Water vapor itself is known to react with the glass surface. The mechanism of this reaction is in dispute but the classical concept is that the water reaction involves an exchange of a proton from the water with a sodium ion in the glass surface with the formation of sodium hydroxide which is later extractable from the glass surface.

When a glass surface is fresh, as when newly formed, in the molten state, or when freshly fractured, the surface is primarily composed of oxygen ions whose electroneutrality has not been satisfied. The surface is extremely reactive and is usually rendered electrically neutral by hydration, so that this glass surface is considered to consist of a layer of hydrated silica, often termed a silica gel structure, expressed as follows:

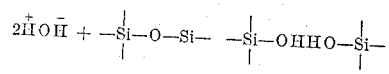

While the end result is an $\overline{OH}$ surface layer, it is obvious that in the reaction with the unsaturated oxygen, only a proton is involved. In subsequent reactions with the surface, the hydrogen ion is the active ion, permitting bonding of various reactive groups to this same oxygen ion by a condensation reaction.

Another possibility which can occur is the reaction of water vapor with silica glass at high temperatures which results in the partial reduction of the $Si^{4+}$ ion to the $Si^{3+}$ state by the hydrogen with the proton being assimilated into the field of the silicon ion.[3] The remaining hydroxyl group is also associated into the structure by causing a break in the normal three dimensional Si—O—Si network, giving rise to an unbonded (to silicon) oxygen as a defect or as associated with an alkali or alkaline earth cation according to the following reaction:

$$Si^{4+} + 2O^{2-} + \tfrac{1}{2} H_2 \to Si^{3+} + O^{2-} - (OH)-$$

It is probably that all of these reactions take place, the determinant as to which reaction depending upon the temperature. That the $\overline{OH}$ ion is assimilated into the structure at melting temperatures can easily be demonstrated by the change in infrared absorption at 2.8 microns. This absorption has been shown to be due to the resonance of the O—H bonded group in the silicate structure.

One thing that is common for all these reactions involving water or water vapor is their dependence upon the hydrogen ion or proton obtained from dissociation of the water molecule. The ease with which these reactions take place even at room temperature would seem to indicate a catalytic effect of the silicate structure on the decomposition of water. It is likely that a reaction or structural change occurs at high temperatures which renders the glass more vulnerable to ionic exchange reactions at lower temperatures. These vulnerable structural weaknesses are believed to reside in the non-bridging oxygen ions to which a proton has been bonded.

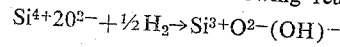

[3] See notes at end of specification.

We have concluded that in view of the foregoing the exchange of these $\overline{OH}$ groups for an inert monovalent ion of the same size, or the replacement of the $\overline{O^2}$ ion before the proton reaction occurs, will result in a structure less vulnerable to attack by water.

The present invention comprises, broadly, the replacement of the divalent $\overline{O^2}$ ions or $\overline{OH}$ groups in the surface of the glass by monovalent ions, whereby the electro-neutrality of the system is satisfied and there will be no imbalance tending to produce exchange between protons of the water in contact with the glass surface and sodium ions in the glass. In furtherance of the invention we replace the oxygen ions or $\overline{OH}$ groups in the surface of the glass with fluorine ions.

As the fluorine ion is very nearly the same size as the oxygen ion, the replacement of $\overline{O^2}$ ions or $\overline{OH}$ groups by $\overline{F}$ is not difficult to achieve. However, chemical modification of a glass surface in accordance with the foregoing is believed to be a basically new method of rendering a glass surface much more corrosion resistant than it would otherwise be.

In arriving at the foregoing theoretical procedure for chemical modification of glass surfaces we have concluded that the driving force for the alkali extraction by water is *not* the desire of the alkali ion to leave the glass structure and enter the aqueous solution but rather the tendency for the proton in the water to achieve an energetically more favorable environment by exchanging positions with a sodium ion in the glass. According to this hypothesis the sodium ion is forced out of the glass by the demands of the system to decrease its free energy according to the following reactions:

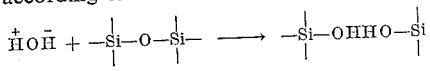

or

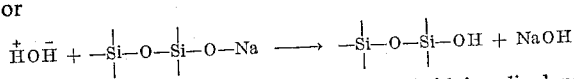

We have found however, that if the unbridging divalent oxygen ion normally coordinated with the sodium ion is replaced by a monovalent fluorine ion, the electro-neutrality of the system is satisfied and the proton exchange will not occur as the driving force of the reaction is no longer there, the reaction being expressed as follow:

Expressing it another way, the fluorine ion is not as polarizable as the oxygen ion. For this reason, the free energy of the glass-water system is not lowered by the proton leaving the water and entering the structure.

As Na+ ions cannot be extracted from the surface of the fluoride treated glass by water or steam even at 250° F. it appears that they diffuse into the glass structure to seek new binding sites.

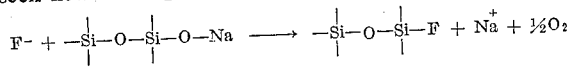

or are combined with excess fluorine to produce sodium fluoride which has a low water solubility.

$$2F^-+Si-O-Si-O-Na \rightarrow Si-O-Si-F+NaF+\tfrac{1}{2}O_2$$

rather than volatilizing from the glass.

As will be described in greater detail later herein, this fluorine reaction is readily accomplished in silicate glasses at ambient temperatures or at the elevated temperatures normally encountered in glass forming operations. When the $\overline{OH}$ groups have been replaced by $F^-$ ions, the new glass surface is no longer attacked by water, but becomes quite inert, even though the same glass before the fluorine substitution would not have been particularly corrosion resistant.

Hydrofluoric acid is, of course, the standard etching medium for glass but it is to be understood that the fluorine treatment of glass surfaces contemplated herein is of a different order entirely from the HF treatment used in etching glass. The quantities of fluorine employed in the present invention and the degree of reaction thereof with the glass is infinitesimal as compared with the reactions involved in etching glass.

The degree of exposure to fluorine in the present invention is far short of that required for a noticeable or appreciable etching of the glass and is only sufficient to produce a substantial ion exchange reaction wherein fluorine ions are exchanged for oxygen or hydroxyl ions.

If the fluorine ion exchange is effected on cold glass the oxygen ions at the surface of the glass will have hydrated to hydroxyl ions and in that case the fluorine ions exchange with the hydroxyl ions. If the treatment takes place at high temperatures, such as in a glass forming machine, free oxygen ions in the surface will be directly replaced by fluorine ions and the replacement will also include non-bridging oxygen ions. Generally speaking, it is believed that the fluorine ion exchange includes all non-bridging oxygen or hydroxyl ions which are available at the surface of the glass.

Table I below shows that the amount of acid reagent required to neutralize the alkali extracted from a given 4 ounce untreated glass container is 2.00 ml. This may be considered to be a standard of comparison indicating the susceptibility to corrosion by water of untreated commercial soda-lime glass. When a similar container is filled with a 5% HF solution for five minutes and then rinsed in distilled water prior to conducting the standard durability test, the amount of reagent required for neutralization is reduced to 1.75 ml. Reference here is to the standard U.S.P. test for chemical durability of glass bottles wherein the rinsed bottle is filled with distilled water and autoclaved at a maximum temperature of 248° F. and 15 pounds per square inch pressure for one hour. The water is then titrated and the amount of acid reagent required to neutralize the alkali in the water is in the measure of the corrosion which has taken place in the test.

In the second treatment tabulated in Table I a much more dilute solution of HF (10 p.p.m.) was placed in the bottle and autoclaved at 248° F. for one hour. This treatment demonstrates the marked effect of increasing the temperature and time since despite the highly dilute solution of HF, it required only 0.51 ml. of 0.02 N $H_2SO_4$ to effect neutralization of the alkali thus extracted from the glass surface as compared with 1.75 ml. in the preceding example.

The third treatment in accordance with the present invention employs any of several Freon type gases as a source of fluorine and is accomplished in a glass bottle machine or a glass tube forming machine. In the case of a glass bottle machine, a Freon gas such as ($C_4F_8$, $CF_2$, $CClF_3$ or $C_2F_4$) is introduced with the blowing air in an amount of about 2½% by volume which resolves itself into about 14 parts of fluorine per million which actually contact the glass surface at the temperatures of the glass when it is being blown. Pyrolysis of the Freon gas at the temperature reached by contact with the hot glass makes a fluorine ion available for reaction.

Of course the more thorough the contact of the fluorine containing air or other fluid with the glass, the more dilute the solution may be. Conversely, the stronger the solution, the shorter the time of contact and the lower the temperature, since etching of the glass is to be avoided in any event. Under various conditions of time, temperature and thoroughness of contact, fluorine solutions varying from 0.05% to 5.0% will give useful results.

In the usual glass container blowing machine the working temperature of the glass is usually from 1200° to 1400° F. and may lie in the general range of from 1000° to 1800° F. In glass tubing machines the working temperature will generally run in the range of from 1400° to 2000° F. At these working temperatures the fluorine reaction is substantially instantaneous and highly effective. The test results of bottles treated in the foregoing three examples are set forth, namely, treatment at ambient temperatures, autoclave treatment, and treatment at working tempertures in a glass bottle machine.

TABLE I

| Treatment: | Ml. 0.02 N $H_2SO_4$ required to neutralize sodium extracted |
|---|---|
| Untreated glass (4 oz. bottle) | 2.00 |
| 5% HF rinse at 70° F. for 5 minutes | 1.75 |
| 10 p.p.m. HF autoclaved at 248° F., for 1 hour | 0.51 |
| 14 p.p.m. HF instantaneous reaction at 1200–1400° F. (blowing air containing 2½% fluorine) | 0.26 |

It is obvious from the above that the fluorine substitution can be accomplished, with varying degrees of effectiveness, at any temperature. However, as in most chemical reactions, it proceeds at a more rapid rate when the temperature is increased.

The following table demonstrates the effectiveness of a variety of fluorine compounds in performing the method of the present invention. It appears that any fluorine containing compound or substance may be employed which will decompose to yield fluoride ions at the temperatures at which the present method is to be performed. In the following table the method was performed on glass containers at the discharge of the forming machine, just prior to their entering the lehr, at temperatures ranging from 1000° F. to 1200° F. The fluorine materials were introduced at room temperature and the treatment was effected substantially instantaneously. All of the fluorine materials listed below are gases excepting the Teflons, which are powdered solids, and the HF and ammonium bifluoride solutions, which are liquids. The Teflon is introduced as a powder but immediately pyrolyzes to a gas. The gases and liquids were introduced into the bottle either for the designated times and flow rates, or as a specific volume, as indicated in the table, all measured at Standard Conditions of pressure and temperature. The first two items in the list are untreated 4 oz. and 12 oz. bottles to show the results of extraction tests on these bottles to serve as a basis of comparison. The reason for the higher extraction figure on untreated 4 oz. bottles than on 12 oz. bottles is explained later herein.

Tests have also been conducted which prove that this effect of preventing or reducing alkali extraction is not a temporary one which is effective through only one extraction test procedure. Bottles that have been subjected to fluorine treatment as outlined in the above examples show less alkali extraction at a second test than on the first. An untreated bottle, on the other hand, will continue to lose the same amount of alkali at each successive test.

It will be noted that the extraction figure for untreated 4 oz. bottles is 2.00 whereas the extraction figure for untreated 12 oz. bottles is 1.30. The reason for this is that the interior surface varies as the square of the dimension (i.e., the diameter of the cylindrical container) whereas the volume varies as the cube of this dimension. The concentration of alkali shown by tests will vary as the area to volume ratio because every unit of the surface area produces an equivalent amount of alkali whereas the relatively greater volume in larger containers tends to dilute the alkali.

All of the extraction figures given herein are the results of the standard U.S.P. durability test which is considered to be equivalent to one year's storage.[4] Even when the time of the durability test is increased to 3 hours, which is equivalent to two years' storage, there is no decrease of durability in the treated bottles, while the alkali extracted from untreated standards is doubled. This data is shown in the following table:

TABLE III

| Treatment (4 oz. bottle): | Ml. 0.02 N $H_2SO_4$ required to neutralize sodium extracted |
|---|---|
| Fluorine treated on forming machine (Table I, line 4) | |
|   1st extraction | 0.26 |
|   2nd extraction | 0.15 |
| Untreated bottles (Table I, line 1) | |
|   1st extraction | 2.00 |
|   2nd extraction | 1.98 |
| Untreated 3-hour U.S.P. test (Table I, line 1) | 4.35 |
| Fluorine treated 3-hour U.S.P. test (Table I, line 4) | 0.26 |

The above data is believed to show clearly that the fluoride ion substitution described above is markedly effective and very permanent.

By varying the concentration of fluoride ions and the

[4] See notes at end of specification.

TABLE II

| Fluorine Containing Material | Quality | Bottle Size, oz. | Durability, ml. $H_2SO_4$ |
|---|---|---|---|
| Untreated | | 4 | 2.00 |
| Do | | 12 | 1.30 |
| Freon 12, $CCl_2F_2$ | 10 CFH/1 sec | 12 | 0.29 |
| Teflon, $CF_2$ | 20 mg | 12 | 0.13 |
| Do | 5 mg | 12 | 0.17 |
| Hydrofluoric Acid of a 1/ (49%), HF | 1 ml. of a 1/100 dilution | 4 | 0.26 |
| Ammonium, $NH_4HF_2$ | 1 ml. of a 1/1000 dilution | 12 | 0.33 |
| Bifluoride Freon 14, $CF_4$ | 2 CFH/5 sec | 12 | 0.25 |
| Sulfuryl Fluoride, $SO_2F_2$ | 6 CFH/5 sec | 12 | 0.22 |
| Freon C-318, $C_4F_8$ | 2 CFH/5 sec | 12 | 0.25 |
| Genetron 152-A, $CH_3CHF_2$ | 2 CFH/5 sec | 12 | 0.24 |
| Genetron 1132-A, $CH_2CF_2$ | 2 CFH/5 sec | 12 | 0.55 |
| Freon 13B-1, $CBrF_3$ | 2 CFH/5 sec | 12 | 0.56 |
| Freon 23, $CHF_3$ | 2 CFH/5 sec | 12 | 0.30 |
| Freon 13, $CClF_3$ | 6 CFH/5 sec | 12 | 0.30 |
| Freon 114, $CClF_2$—$CClF_2$ | 1 CFH/5 sec | 12 | 0.28 |
| Vinylidene Fluoride, $CH_2=CF_2$ | 1 CFH/5 sec | 12 | 0.00 |
| Freon 22, $CHClF_2$ | 6 CFH/1 sec | 12 | 0.15 |
| Freon 115, $CClF_2$—$CF_3$ | 6 CFH/1 sec | 12 | 0.16 |
| Perfluoro Propane, $C_3F_8$ | 1 cc | 4 | 0.06 |
| Freon C-318, $C_4F_8$ | 2 cc | 4 | 0.07 |
| Freon 115, $CClF_2$—$CF_3$ | 2 cc | 4 | 0.07 |
| Freon C-318, $C_4F_8$ | 4 cc | 12 | 0.12 |
| Do | 4 cc | 12 | 0.08 |
| Do | 8 cc | 12 | 0.11 |
| Freon C-318, $C_4F_8$ | 6 cc | 26 | 0.08 |
| Freon 115, $CClF_2$—$CF_3$ | 6 cc | 26 | 0.05 |
| | | | 0.04 | time and temperature of the exposure of the glass to the fluoride ions, it is possible to control the chemical durability of the treated glass. Thus chemical durability may be varied according to requirements and a wide range of fluorine concentrations and time and temperature factors may be employed.

In addition to the fluorine compounds referred to above, other fluorine-containing compounds may be employed, such as the ammonium fluorides, $NH_4F$ and $NH_4HF$, fluorides such as $CH_3F$, $C_2H_5F$, $C_6H_5F$ and others. $(NH_4)SiF_6$, $BF_3$ and $AlF_3$ also may be used. Where it is not objectionable to constituents not common to glass the metallic fluorides may be used.

NOTES (1) A. Cousen and C. J. Peddle J. Soc. Glass Tech 20 418, (1963).
(2) H. S. Williams and W. A. Weyl Glass Ind. 26 275 (1945).
(3) G. Hetherington and K. H. Jack Phys. and Chem. Glasses 3 129–133, (1962).
(4) A. K. Lyle, J. A. Cer. Soc., 26 201 (1943).

We claim:
1. The method of increasing the chemical durability of soda-lime glass containing extractable alkali, said glass having unbridging oxygen ions and hydroxyl ions at a surface thereof, said method comprising exposing such surface to the action of a fluorine containing substance capable of supplying fluoride ions to said surface, the fluorine concentration, the temperature at said surface, and the time of exposure being jointly sufficient to produce a substantial exchange of fluoride ions for oxygen and hydroxyl ions at such surface without a discernible etching thereof.

2. The method of increasing the chemical durability of soda-lime glass containing extractable alkali, said glass having unbridging oxygen ions at a surface thereof, said method comprising exposing such surface to the action of a fluorine containing substance capable of supplying fluoride ions to said surface, the fluorine concentration, the temperature at said surface, and the time of exposure being jointly sufficient to produce a substantial exchange of fluoride ions for oxygen ions at such surface without a discernible etching thereof.

3. The method of increasing the chemical durability of soda-lime glass containing extractable alkali, said glass having hydroxyl ions at a surface thereof, said method comprising exposing such surface to the action of a fluorine containing substance capable of supplying fluoride ions to said surface, the fluorine concentration, the temperature at said surface, and the time of exposure being jointly sufficient to produce a substantial exchange of fluoride ions for hydroxl ions at such surface without a discernible etching thereof.

References Cited by the Examiner
UNITED STATES PATENTS

| | | | |
|---|---|---|---|
| 1,760,427 | 5/1930 | Matlock | 65—31 |
| 1,807,017 | 5/1931 | Smith | 65—30 |
| 2,154,490 | 4/1939 | Burch | 65—30 |
| 2,455,719 | 12/1948 | Weyl et al. | 65—30 |
| 2,982,053 | 5/1961 | Elmer | 65—30 |
| 3,249,246 | 5/1966 | Mahoney | 65—30 |

DONALL H. SYLVESTER, *Primary Examiner.*

G. R. MYERS, *Assistant Examiner.*

UNITED STATES PATENT OFFICE
CERTIFICATE OF CORRECTION

Patent No. 3,314,772                              April 18, 1967

James P. Poole et al.

It is hereby certified that error appears in the above numbered patent requiring correction and that the said Letters Patent should read as corrected below.

Column 2, line 50, for "probably" read -- probable --; column 3, lines 70 and 71, strike out "the OH groups have been replaced by F- ions, the new normally encountered in glass forming operations. When" and insert instead -- normally encountered in glass forming operations. When the OH groups have been replaced by F- ions, the new --; columns 5 and 6, in TABLE II, the heading to the second column, for "Quality" read -- Quantity --; same TABLE II, first column, line 6 thereof, for "of a 1/(49%),HF" read -- HF (49%) --.

Signed and sealed this 14th day of November 1967.

(SEAL)
Attest:

Edward M. Fletcher, Jr.
Attesting Officer

EDWARD J. BRENNER
Commissioner of Patents